(12) United States Patent
Wee

(10) Patent No.: US 6,272,122 B1
(45) Date of Patent: Aug. 7, 2001

(54) PILOT PN OFFSET ASSIGNING METHOD FOR DIGITAL MOBILE TELECOMMUNICATIONS SYSTEM

(75) Inventor: Pyeong-Hwan Wee, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/039,681

(22) Filed: Mar. 16, 1998

(30) Foreign Application Priority Data

Apr. 14, 1997 (KR) ................................................ 97-13591

(51) Int. Cl.$^7$ ........................................................ H04B 7/04
(52) U.S. Cl. ............... 370/342; 370/341; 370/334; 370/343; 370/345
(58) Field of Search ....................... 370/342, 345, 370/341, 343, 350, 332, 334, 335, 441; 455/186.1, 4.2

(56) References Cited

U.S. PATENT DOCUMENTS 5,267,261  *  11/1993  Blakeney, II et al. ................... 375/1
5,920,551  *  7/1999  Na et al. ................................ 370/335
5,926,470  *  7/1999  Teidemann ............................ 370/334

* cited by examiner

Primary Examiner—Dang Ton
Assistant Examiner—Anthony Ton
(74) Attorney, Agent, or Firm—Dilworth & Barrese, L

(57) ABSTRACT

There is provided a method for assigning a pilot PN(PseudoNoise) offset to a base station in a digital mobile telecommunications system. In the pilot PN offset assigning method, a single cluster is divided into a plurality of subclusters, and a plurality of general base stations and reserved base stations, each having a plurality of sectors, are arranged in each of the subclusters. Then, a pilot PN offset is assigned to each sector, such that the PN offset difference between a sector and a next sector in the same base station is equal to a pilot increment times the number of subclusters in the cluster according to sector numbers, the PN offset difference between the same sectors in corresponding base stations under different subclusters is equal to the pilot increment, and the PN offset difference between the same sectors in a current base station and the next base station under an identical subcluster is equal to the number of subclusters in the cluster times the number of sectors in a base station×the pilot increment.

13 Claims, 10 Drawing Sheets

PILOT PN OFFSET ASSIGNING METHOD FOR DIGITAL MOBILE TELECOMMUNICATIONS SYSTEM

BACKGROUND OF THE INVENTION

1. Field of the Invention

The present invention relates to a method for assigning a pilot PN(PseudoNoise) offset for a digital mobile telecommunications system, and in particular, to a method for assigning a pilot PN offset which can increase pilot PN offset re-use efficiency.

2. Description of the Related Art

In general, since frequency resources are limited in mobile telecommunications systems, these frequency resources should be re-used. In current analog mobile telecommunication systems, different frequencies are allocated to a mobile unit and a cell site. The frequencies used for the mobile unit and the cell site are divided into two groups: block A and block B.

FIG. 1a illustrates transmit frequencies and channel numbers for mobile units, and FIG. 1b illustrates transmit frequencies and channel numbers for cell sites. In such an analog mobile telecommunications system, 42 set-up channels and 624 voice channels are assigned as follows.

TABLE 1

| channel number | usage | remarks |
| --- | --- | --- |
| 1–312 | voice channel | block A |
| 313–333 | set-up channel | block A |
| 334–354 | set-up channel | block B |
| 355–666 | voice channel | block B |

Due to the finite frequency spectrum, the frequency re-use concept is applied to mobile telecommunications systems by allocating different frequencies to adjacent cell sites, and the same frequency to cells that are remote from each other. As shown in FIG. 2, a cell site CS1 and its neighbor CS2 use different frequencies, whereas the cell site CS1 and its remote cell site CS3 use the same frequency. Here, the cell sites CS1 and CS3 should be too far away from each other to cause co-channel interference.

A frequency re-use distance D, for example, between cell sites CS1 and CS3, which allows the same frequency channel to be re-used, can be determined from $$D = \sqrt{3K} \times R \quad (1)$$

where K is frequency re-use efficiency and R is the radius of a cell site.

$$K = i^2 + i \cdot j + j^2 \quad (2)$$

where i is the distance between adjacent cells (e.g., CS1 and CS2) and j is the distance between cells using the same channel frequency (e.g., CS2 and CS3)

The frequency re-use distance D depends on the number of co-channel cells in the vicinity of a cell, the type of geographic terrain contour, the antenna height, the transmitted power at each cell site, and a desired carrier-to-interference (C/I) ratio. If the frequency re-use distance D decreases, the frequency re-use efficiency K increases and the co-channel interference simultaneously increases. Hence, the challenge is to obtain the smallest number K which can still meet intended service quality. If D=3.46R, K=4, if D=4.6R, K=7, if D=6R, K=12, and if D=7.55R, K=19. The (D=4.6R, K=7) frequency re-use pattern is generally used.

The above frequency allocating method for analog mobile telecommunications systems is not feasible for digital mobile telecommunications systems. In general, a CDMA (Code Division Multiple Access) digital mobile telecommunications system uses pilot PN codes. Since there are a limited number of pilot PN codes (i.e., 512 (0–511)), all base stations cannot have different pilot PN codes. In pursuit of pilot PN code re-use under these circumstances, if a pilot increment (hereinafter, referred to as PT-inc) decreases, pilot code re-use efficiency increases, while the PN code and PN offset differences between adjacent base stations are smaller, resulting in interference. On the other hand, if the PT-inc increases, the PN offset difference between adjacent base stations decreases, thereby reducing interference, while the pilot code re-use efficiency drops.

The conventional frequency allocating method for an analog mobile telecommunications system cannot be applied to the PN code assignment for a digital mobile telecommunications system. This is because the conventional method considers only the re-use distance. In the digital mobile telecommunications system, delay-caused offset difference, as well as re-use distance should be considered.

A specific re-use pattern is not set for such a pilot code assigning method in the digital mobile telecommunications system. In general, a re-use PT-inc is set to 10 or 12, and a re-use distance is set to 6R (here, R is the radius of a base station), in order to prevent interference.

However, with a PT-inc of 10 in a three-sector digital mobile telecommunications system, an identical pilot PN code is used at every 17th base station, resulting in the decrease of the re-use efficiency and possible interference. With a PT-inc of 12, the re-use distance is 6.25R at maximum. In this case, as far as all cells have the same transmitted output and the same radius, in a flat area in terms of wave environment, no interference exists between cells sharing an identical pilot code. However, in implementing an actual wireless optimization, each base station has a different transmitted output, the cell radius is not uniform, and a signal delay due to multipath by 6R or larger in a line-of-sight condition may be introduced. Thus, handoff and call failures may result.

SUMMARY OF THE INVENTION

An object of the present invention is to provide a method for assigning a quadrature code applied to a pilot channel of a base station in a digital mobile telecommunications system.

Another object of the present invention is to provide an optimum method for assigning a pilot PN code to a base station which considers a re-use distance for a re-use pattern and a delay-caused offset.

Still another object of the present invention is to provide a method for assigning PN offsets to three-sector base stations arranged in each of a plurality of subclusters under a single cluster.

A further object of the present invention is to provide a method for assigning PN offsets to three-sector base stations arranged in a single cluster without subclusters.

To achieve the above objects, there is provided a method for assigning a pilot PN offset to a base station in a digital mobile telecommunications system. In the pilot PN offset assigning method, a single cluster is divided into a plurality of subclusters, and a plurality of general base stations and reserved base stations, each having a plurality of sectors, are arranged in each of the subclusters. Then, a pilot PN offset is assigned to each sector, so that the PN offset difference between one sector and a next sector in the same base station is (a pilot increment×the number of subclusters in the cluster) according to sector numbers. The PN offset difference between the same sectors in corresponding base stations under different subclusters is the pilot increment, and the PN offset difference between the same sectors in a current base station and the next base station under an identical subcluster is (the number of subclusters in the cluster×the number of sectors in a base station×the pilot increment).

According to the second aspect of the present invention, a single cluster is divided into a plurality of subclusters, and a plurality of general base stations and reserved base stations, each having a plurality of sectors, are reserved in each of the subclusters. Then, a pilot PN offset is assigned to each sector, so that the PN offset difference between one sector and a next sector in the same base station is (a pilot increment×the number of subclusters in the cluster×the number of base station in a subcluster—(the number of subclusters having no PN offsets in the last base stations thereof×the pilot increment)) according to sector numbers. The PN offset difference between the same sectors in corresponding base stations under different subclusters is the pilot increment, and the PN offset difference between the same sectors in a current base station and the next base station under an identical subcluster is (the number of subclusters in the cluster×the pilot increment).

According to a third aspect of the present invention, each of a plurality of base stations is divided into a plurality of sectors, and the base stations are arranged sequentially from the innermost tier to the outermost tier, centering on a reference base station in a single cluster. Then, a pilot PN offset is assigned to each sector, so that the PN offset difference between one sector and a next sector in the same base station is a pilot increment according to sector numbers, and the PN offset difference between the same sectors in a current base station and the next base station is (the number of sectors in a base station×the pilot increment).

According to a fourth aspect of the present invention, each of a plurality of base stations is divided into a plurality of sectors, and the base stations are arranged sequentially from the innermost tier to the outermost tier, centering on a reference base station in a single cluster. Then, a pilot PN offset is assigned to each sector, so that the PN offset difference between one sector and a next sector in the same base station is (a pilot increment×the number of base stations) according to sector numbers, and the PN offset difference between the same sectors in a current base station and the next base station is the pilot increment.

According to a fifth aspect of the present invention, each of a plurality of base stations is divided into a plurality of sectors, and the base stations are arranged nonsequentially from the innermost tier to the outermost tier, centering on a reference base station in a single cluster. Then, a pilot PN offset is assigned to each sector, so that the PN offset difference between one sector and a next sector in the same base station is a pilot increment according to sector numbers, and the PN offset difference between the same sectors in a current base station and the next base station is (the number of sectors in a base station×the pilot increment).

According to a sixth aspect of the present invention, each of a plurality of base stations is divided into a plurality of sectors, and the base stations are arranged nonsequentially from the innermost tier to the outermost tier, centering on a reference base station in a single cluster. Then, a pilot PN offset is assigned to each sector, so that the PN offset difference between one sector and a next sector in the same base station is (a pilot increment×the number of base stations) according to sector numbers, and the PN offset difference between the same sectors in a current base station and the next base station is the pilot increment.

DETAILED DESCRIPTION OF THE PREFERRED EMBODIMENTS

In a CDMA (Code Division Multiple Access) mobile telecommunications system, which is a next generation digital mobile telecommunication system, allocation of a pilot PN (PseudoNoise) code to each sector of a cell is very important in designing a wireless network. Even though all sectors in the CDMA system share an identical frequency by code division spread band multiple access, the sectors spread signals by means of their different pilot PN codes, so that mobile stations can extract information through reverse spreading. Each sector should be assigned a pilot PN code. However, it is difficult to assign different pilot PN codes to all the sectors due to a limited number of pilot PN codes. Thus, the pilot PN codes should be re-used in different sectors. The embodiments of the present invention pertain to a method for assigning pilot PN codes for minimizing interference between sectors by adjusting factors determining the number of pilot PN codes and rearranging determined pilot PN codes.

A pilot signal allows a mobile station to acquire timing phase synchronization. It also acts as a reference for the mobile station to measure the signal strength of a base station, and provides identification information for identifying a sector. The pilot PN codes are time-shifted and assigned to sectors, and may generate interference due to multipath delay. To prevent interference, a shift interval and an assignment method of the pilot PN codes should be considered.

Here, the following will be described: (1) modeling a pilot signal with reference to its generation and structure; (2) the relationship between the pilot signal and a mobile station while the mobile station processes a call; (3) a procedure for obtaining the number of pilot PN codes by calculating the distance between different base stations using the same pilot PN code and the shift interval of the pilot PN codes; (4) re-use of determined pilot PN codes; and (5) a method for assigning a pilot PN code according to embodiments of the present invention.

1. Modeling of Pilot Signal with reference to its Generation and Structure

A forward-link CDMA channel has pilot, sync, paging, and traffic channels. Each channel has a quadrature code defined by a Walsh function, and I and Q PN sequence codes, and is spread to a mobile station at 1.2288 Mcps. The pilot channel, generated as shown in FIG. 3, is continuously transmitted at every CDMA carrier to keep the mobile station synchronized.

Figure 1A:
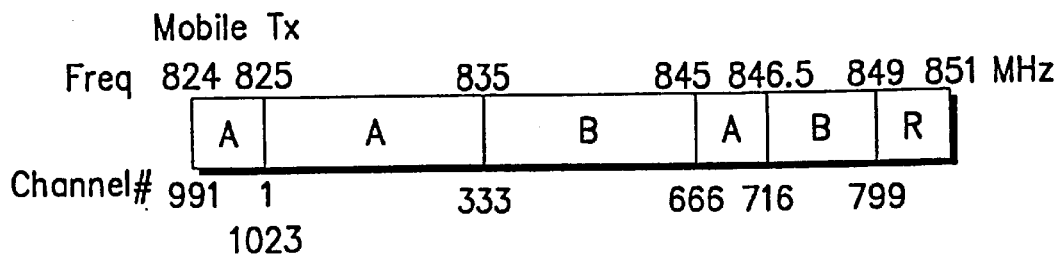
FIGS. 1a and 1b illustrate channel frequency assignments for conventional analog mobile telecommunications system.
Figure 1B:
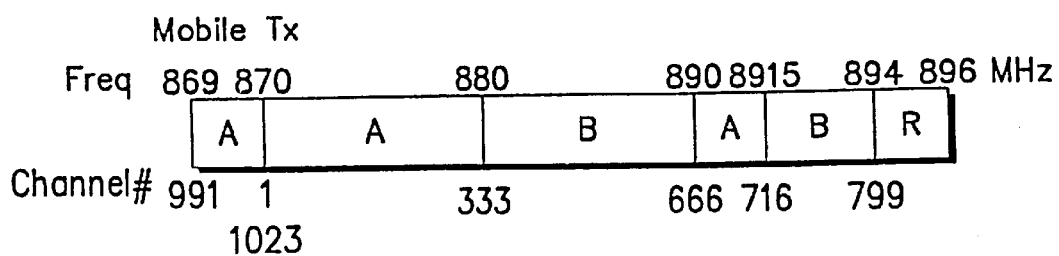
Figure 2:
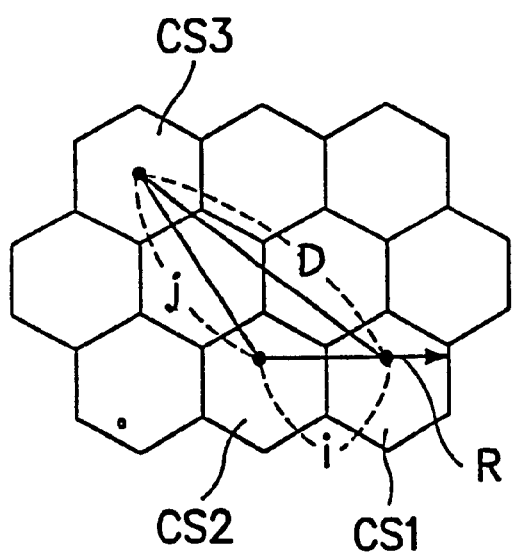
FIG. 2 is a plan view for calculating a frequency re-use distance for the conventional mobile telecommunication system.
Figure 3:
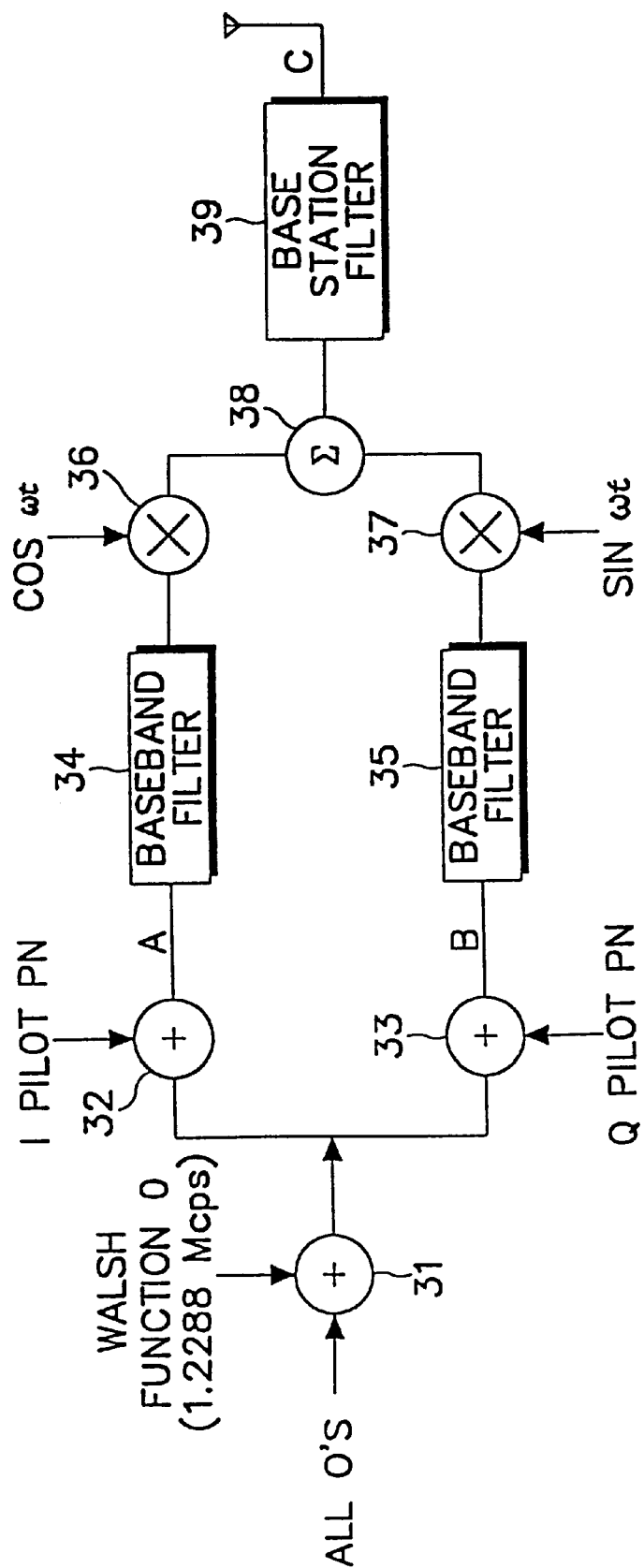
FIG. 3 is a block diagram of a structure for generating a pilot signal in a digital mobile telecommunications system.

FIG. 3 illustrates a structure for generating a pilot signal in a CDMA cellular system. An adder 31 adds input data being all 0s to Walsh function 0 at 1.2288 Mcps, and outputs the added value to adders 32 and 33. The adder 32 adds the output of the adder 31 to I pilot PN and outputs the added value to a baseband filter 34. The adder 33 adds the output of the adder 31 to Q pilot PN, and outputs the added value to a baseband filter 35. The baseband filter 34 filters a baseband signal from the output signal of the adder 32 to a mixer 36. The baseband filter 35 filters a baseband signal from the output signal of the adder 33 to a mixer 37. The mixer 36 mixes the output of the baseband filter 34 with a local oscillation signal cosωt, and outputs the mixed result to an adder 38. The mixer 37 mixes the output of the baseband filter 35 with a local oscillation signal sinωt, and outputs the mixed result to the adder 38. The adder 38 adds the outputs of the mixers 36 and 37, and outputs the added value to a base station filter 39. The base station filter 39 outputs the output signal of the adder 38 as a pilot PN code for a corresponding base station.

The pilot channel is orthogonally spread by Walsh function 0, which is virtually an unmodulated signal with 0s for all symbols. Assuming that the I and Q PN sequences are $\{C_I^{(0)}\}$ and $\{C_Q^{(0)}\}$, respectively, a zero offset I-pilot PN sequence and a zero offset Q-pilot PN sequence are respectively $$(\ldots, C_I^{(0)}(0), C_I^{(0)}(1), C_I^{(0)}(2), \ldots), C_I^{(0)}(j) \in \{0,1\} \quad (3)$$

$$(\ldots, C_Q^{(0)}(0), C_Q^{(0)}(1), C_Q^{(0)}(2), \ldots), C_Q^{(0)}(j) \in \{0,1\} \quad (4)$$

A pilot PN sequence can be expressed as $$\{C_I^{(k)}(I)\} = C_I^{(0)}(I-k), I = \ldots, -1, 9, 1, \quad (5)$$

Figure 4:
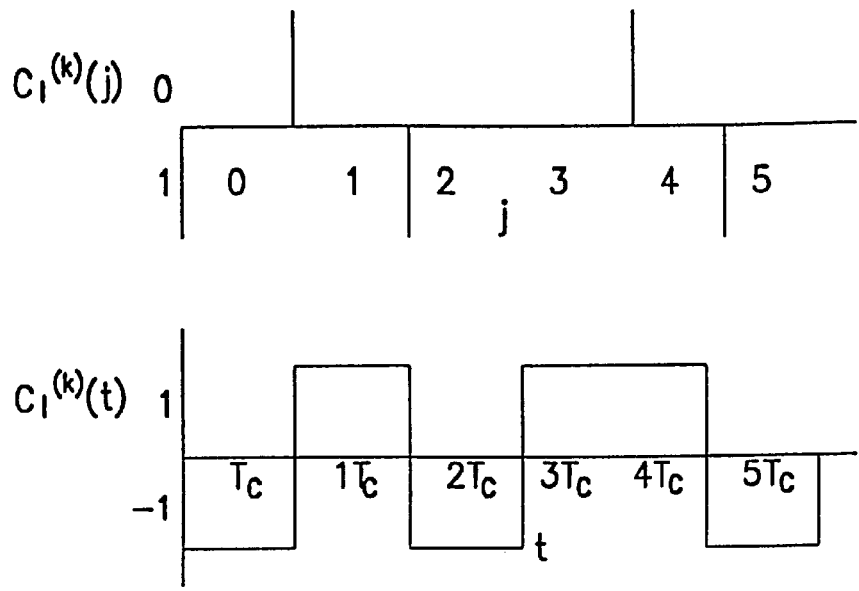
FIG. 4 is a generation timing diagram of a pilot PN sequence.

FIG. 4 illustrates the generation of $C_I^{(k)}(t)$ from $C_I^{(k)}(j)$. The pilot PN sequence is practically of period $2^{15}$ obtained by adding "0" to a maximal length LFSR(linear feed-back shift register) sequence with a period $(2^{15}-1)$. To obtain a model of the pilot signal, a receiver at a mobile station should be completely synchronous with the phase of a carrier, and then an impulse response with respect to a propagation path is II(t) and of length $T_c$.

Assuming that $C_I^{(0)}(t)$ is an I-pilot baseband signal having a zero phase and unit power, $C_I^{(0)}(t)$ is a sequence of pulses, expressed as $$C_I^{(0)}(t) = \sum_{j=-\infty}^{j=\infty} (-1)^C II(t - jT_c) \quad (6)$$

$$II(t - jT)_0^1 jT_c < t \leq (j+1)T_c$$

Therefore, an I-pilot signal with a phase k is given by $$C_I^{(0)}(t) = \sum_{j=-\infty}^{j=\infty} (-1)^{C_j^{(0)}} II(t - jT_c) = C_I^{(0)}(t - kT_c) \quad (7)$$

Time and power differences between the pilots of sectors are most significant in assigning pilot phases in the above CDMA system. Since the two I and Q signals experience the same phenomena in terms of time and power, it is sufficient to consider either of the signals. Assuming that a pilot PN signal having the phase k transmitted from a base station and power p is $$\sqrt{P}c_I^{(k)}(t)$$

γ is a time delay factor, and λ is a path loss factor, a specific CDMA multipath signal can be expressed as $$\lambda \sqrt{\sqrt{P}} c_I^{(k)}(t-\tau) = \lambda \sqrt{\sqrt{P}} c_I^{(0)}(t-kT_c\tau) \quad (8)$$

2. Call Processing in Mobile Station

In an initialization state of a mobile station, when power is on, the mobile station selects which system to use (e.g., system A, system B, CDMA, AMPS (Advanced Mobile Phone Service)) and is initially synchronized. If CDMA is selected, the mobile station acquires a pilot signal of the system through a serial search which continues until a particular pilot offset is found. Since the pilot signal has a period of $2^{15}T_c$, a time offset is between 0 and $2^{15}T_c$. The time offset is generally searched for at every $T_c$ step increment. If only one pilot signal exists, the time required for accurate synchronization of the mobile station is $2^{14}T_{cn}$ on the average. However, in a general system, one or more pilots are found in most areas, and the time required for the mobile station to search for a pilot may be varied according to the phase difference between two pilots in a boundary area. Therefore, selection of a proper phase offset in an adjacent sector can reduce pilot channel acquisition time.

In a traffic channel state, the mobile station communicates with a base station using forward and reverse traffic channels, and processes pilot PN codes transmitted from other base stations through the steps of: (1) searching for other pilot signals; (2) measuring pilot PN phases; and (3) checking interfering pilots from other base stations.

While communicating with the base station, the mobile station manages four sets of pilot channels during the step of searching for other pilot signals, i.e., active set, candidate set, neighbor set, and remaining set. The active set is continuously demodulated in the current mobile station, and the other three sets are likely candidates to be registered and demodulated for handoff of the mobile station. The mobile station keeps monitoring these sets. The active, candidate, and neighbor sets are divided according to phase offsets, while the remaining set is differentiated according to PT-inc.

That is, pilots in the remaining set are arranged in 64×PT-inc units. Here, the PT-inc is a designated PN offset increment value for PN offset assignment. As the PT-inc is larger, the number of remaining sets is smaller and pilot searching time is simultaneously reduced. That is, the likelihood of finding a pilot set strong enough for handoff in an actual situation can be increased. However, this brings about a limited increase in performance since the remaining set is rather insignificant relative to the other pilot sets.

In the step of measuring the pilot PN phases, if the mobile station finds a pilot signal exceeding a given T_ADD level in decibels, it reports the strength and phase of the pilot signal to the base station through a pilot strength measurement message (PSMM). Here, the transmitted phase is calculated by the mobile station according to the equation: PILOT_PN_PHASE=PILOT_ARRIVAL+(64×PILOT_PN)mod$2^{15}$, and the base station determines which sector the pilot comes from and starts a handoff process.

In the step of checking interfering pilots from other base stations, the mobile station demodulates forward traffic channels by coherently combining three or four multipaths. In addition, since the pilot signals of all base stations are time-shifted, pilots from other base stations may be mistaken for the active set. However, proper assignment of pilot PN phases decrease such errors.

3. Determination of PT-inc

The PT-inc is one of the system parameters transmitted from a base station to a mobile station in the CDMA system. The mobile station searches for a pilot while incrementing its phase by a multiple of the PT-inc. Here, the number of pilot PN codes assigned to base stations depends on the PT-inc. For example, if the PT-inc is 12, 42 (=$^{512}/_{12}$) pilot PN codes (0, 12, 14, 36, . . . ) are available to the base stations.

Figure 5:
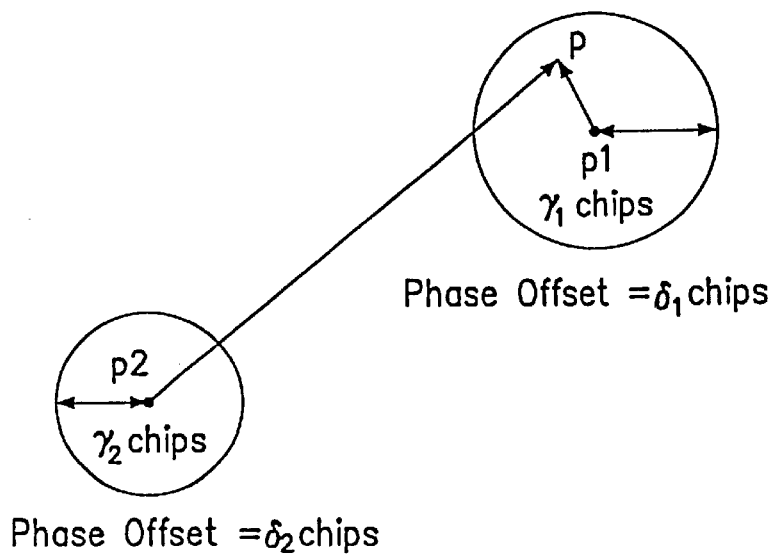
FIG. 5 is a plan view for describing pilot interference between two base stations in a digital mobile telecommunications system.

FIG. 5 illustrates pilot interference between two base stations. It is assumed that there are two base stations, and a mobile station is positioned at point P to determine the PT-inc.

Factors used in determining the PT-inc are defined as follows:

$\lambda$: path loss factor $P_i$ (i=1, 2): transmit power strength of two base stations $r_i$ (i=1, 2): radii of two base stations expressed in terms of pilot chips $s_i$ (i=1, 2): active search windows expressed in terms of pilot chips $\delta_i$ (i=1, 2): PN phase offsets of two base stations expressed in terms of pilot chips.

Here, pilot signals s1(t) and s2(t) respectively transmitted from base stations 1 and 2 are determined by $$s_1(t) = \sqrt{\sqrt{P_1}C_I^{(\delta,\eta)}}(t) = \sqrt{\sqrt{P_1}C_I^{(0)}}(t-\delta_1 T_c) \; s_2(t) = \sqrt{\sqrt{P_2}C_I^{(\delta,\eta)}}(t) = \sqrt{\sqrt{P_2}C_I^{(0)}}(t-\delta_2 T_c) \quad (9)$$

Assuming that $\lambda_1$ and $_{t1}T_c$ are the path loss and time delay of a mobile station 1, respectively, $\lambda_2$ and $t_2 T_c$ are the path loss and time delay of a mobile station 2, respectively, and $y_1(t)$ and $y_2(t)$ are pilots received at both mobile stations 1 and 2, $$y_1(t)=\lambda_1 s_1(t-\tau_1 T_c)=\lambda_1 P_1 C_I^{(0)}(t-\delta_1 T_c-\tau_1 T_c) \; y_2(t)=\lambda_2 s_2(t-\tau_2 T_c)=\lambda_2 P_2 C_I^{(0)}(t-\delta_2 T_c-\tau_2 T_c) \quad (10)$$

If the pilots of both base stations 1 and 2 are transmitted, with the same phase difference, to the mobile station positioned at point P of FIG. 5, the mobile station experiences interference by the pilot of base station 2. This can be expressed as $$\delta_1 T_c + \tau_1 T_c = \delta_2 T_c + \tau_2 T_c \rightarrow \tau_1 - \tau_2 = \delta_2 - \delta_1 \quad (11)$$

However, the pilot signal of base station 2 becomes very weak in equation (11), and if the strength difference between two pilots is a predetermined level or lower, little interference is observed. The power ratio of two pilots at point P in FIG. 5 is given by $$C/I = \frac{P_1 \lambda_1}{P_2 \lambda_2} = 10\log_{10}\left[\frac{D(P, P1)}{D(P, P2)}\right] \geq a \quad (12)$$

The offset difference between the two pilots, caused by path delay, is $$m=D(P, P2)-D(P, P1) \quad (13)$$

If $D(P, P1)<(r_1+s_1)$, the pilot offset difference m between the two base stations is $$m \geq (r_1+s_1)(10^{\alpha/10\gamma})-1 \quad (14)$$

In the above equation (14), m can be the smallest PT-inc value. For example, C/I=23 dB, $r_1=r_2 \leq 25$ Km=105 chips, $\gamma=3$, and search window size=14 chips, m≦632 chips which is expressed as a multiple of 64 chips, that is, 640 chips (10×64). Thus, the PT-inc is 10. The number of pilot PN codes obtained in the above method is 51 (=512/10), which is smaller than the total number of base stations. Therefore, the pilot PN codes should be re-used.

4. Re-use of Phase Offsets

When an identical pilot PN sequence phase offset is used in two or more base stations, a mobile station may experience interference by a base station using the same pilot offset, and pilot signals reported from mobile stations cannot be differentiated in a base station. Both cases can be avoided by geographically separating the base stations sharing the same pilot PN sequence phase offset from each other.

Figure 6:
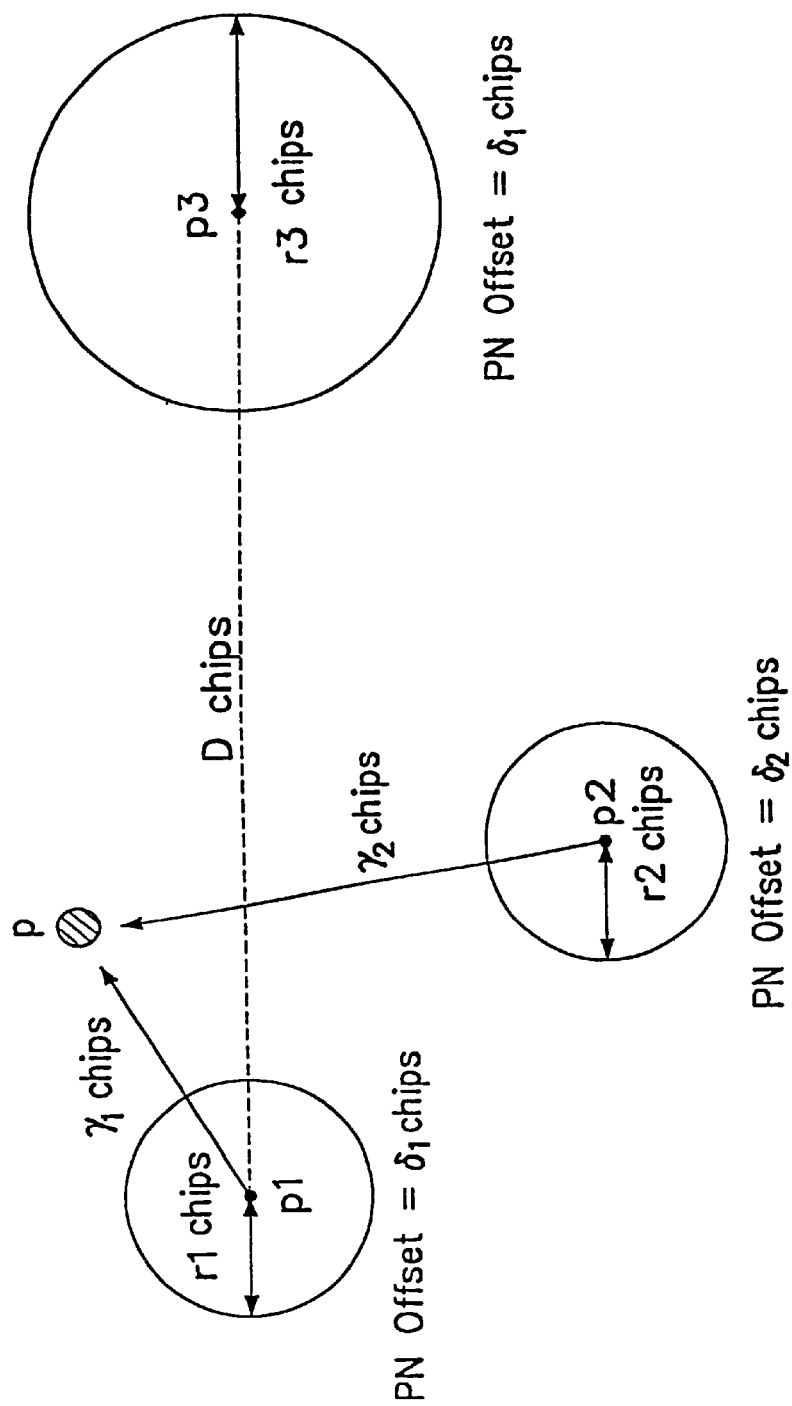
FIG. 6 is an illustration of the re-use of a pilot PN sequence phase offset in the digital mobile telecommunications system.

FIG. 6 illustrates re-use of a pilot PN sequence phase offset. In FIG. 6, base stations 1 and 3 have the same pilot PN sequence phase offset.

Factors for re-use of pilot PN sequence phase offsets in FIG. 6 are as follows:

$r_i$ (i=1, 2, 3): radius of a base station, expressed in terms of pilot chips

D: distance measured from base station 1 to base station 3, and expressed in terms of pilot chips $s_i$: active search window of base stations 1 and 3

$s_2$: search window size of neighbor set and remaining set of base stations 1 and 3

A mobile station located in base station 1 is likely to experience by the pilot of base station 3 if the pilot of base station 3 exists in the active set search window. The interference can be prevented by satisfying $$D \geq 2r_1 + s_1 \quad (15)$$

To prevent the pilot of base station 1 from influencing a mobile station in base station 3, $$D \geq 2r_3 + s_3 \quad (16)$$

To identify the pilot signal reported by a mobile station in base station 2, base stations 1 and 3 should be located within the hearing distance of the mobile station in base station 2. To identify base stations 1 and 3 regardless of the location of the mobile station in base station 2, the distance between base stations 1 and 3 should be $$D \geq 2(2r_2+s_2)=4r_2+rs_2 \quad (17)$$

For example, if all the base stations have the same radius of r chips, and the search window of the remaining set is larger than that of the neighbor set and has r/2 chips, D becomes the smallest distance between base stations 1 and 3 reusing the pilot PN sequence phase offset, as follows $$D \geq 5r \qquad (18)$$

5. Phase Assigning Procedure

To assign the PN sequence phase offsets, a PT-inc, pilot codes, and the distance between base stations using the same pilot offset, are determined, and pilot PN codes are reserved for additional base stations and microcells.

It is assumed that 512 PN codes are available to a digital mobile telecommunications system, and each base station can serve three sectors. In a three-sector base station, three antennas are arranged equally at 120° and each antenna uses its own PN offset. Thus, a single base station uses three PN offsets. Here, if a PT-inc is 10, 51 pilot offsets are produced. If only 39 offsets are used, the remaining 12 offsets are reserved for extension of base stations.

Figure 7:
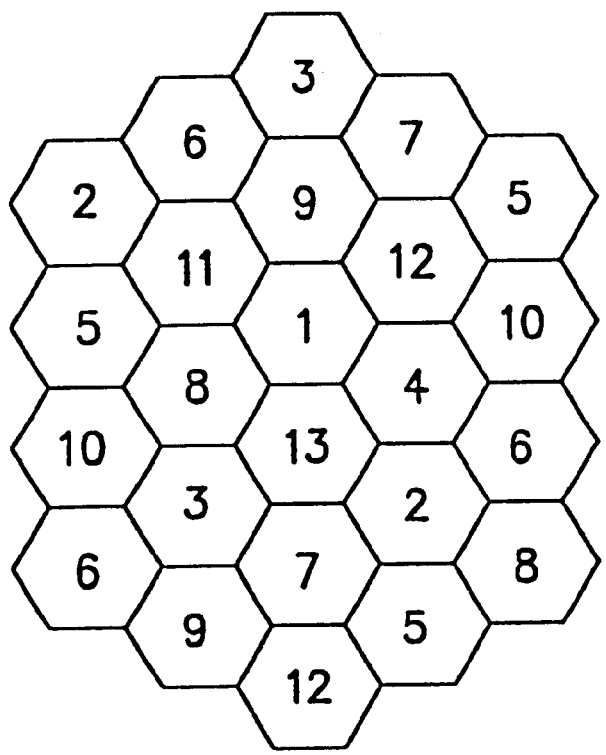
FIG. 7 illustrates an example of pilot PN sequence phase assignment for the digital mobile telecommunications system.
Figure 7:

FIG. 7 illustrates an example of assigning phase offsets to general base stations. Referring to FIG. 7, general base stations are numbered 1–13, and numbers 14–17 are reserved for additional base stations. Therefore, this is similar to an (N=13) frequency re-use pattern for an analog mobile telecommunications system. Each base station is assigned PN offsets according to n×640, (n+17)×640, and (n+34)×640, thus being sectorized. The distance between base stations having the same pilot offset is 6r or more. Here, r is the radius of a base station.

For phase assignment, 51 different phase offsets {0×640, 1×640, 2×640, 3×640, . . . , 49×640, 50×640} are categorized into four sets.

Set 1: {0×640, 1×640, . . . , 19×640, 13×640}
set 2: {18×640, 19×640, . . . , 29×640, 30×640}
set 3: {35×640, 36×640, . . . , 46×640, 57×640}
set 4: remaining 12 phase offsets The pilot sets 1–3 are applied to general base stations, and the set 4 is reserved for base stations having no general structure. All the base stations are assigned the pilot offsets of set 1, and sectorized base stations are also assigned sets 2 and 3. In this case, pilot offsets assigned to four adjacent sectors belong to different categories, which is an ideal assignment of pilot offsets to adjacent sectors.

PN offsets are assigned using subclusters in first and second embodiments of the present invention, whereas PN offsets are assigned without subclusters in other embodiments of the present invention. Here, each base station is divided into three sectors, that is, sector α, sector β, and sector γ, and uses three PN codes. Furthermore, search pilot signals are grouped into four sets: active, candidate, neighbor, and remaining sets. A pilot PN phase is obtained by PILOT_ARRIVAL+(64×PILOT_PN)mod$2^{15}$. With a PT-inc of 4, 128 (=512/4) PN offsets are available, with a PT-inc of 10, 51 (=512/10) PN offsets, and with a PT-inc of 12, 42 (=512/12) PN offsets.

In the first embodiment of the present invention, PN offsets are assigned to base stations so that (1) the PN offset difference between sector α and sector β of a base station and between sector β and sector γ thereof is (PT-inc×the number of subclusters in a cluster), (2) the PN offset difference between the same sectors (e.g., sectors α) in the same-numbered base stations (e.g., base stations 1) of different subclusters is PT-inc, and (3) the PN offset difference between the same sectors (e.g., sectors α) in a current base station and the next base station (e.g., base station 1 and base station 2 under the same subcluster is (the number of subclusters×the number of sectors in a base station×PT-inc).

Figure 8:
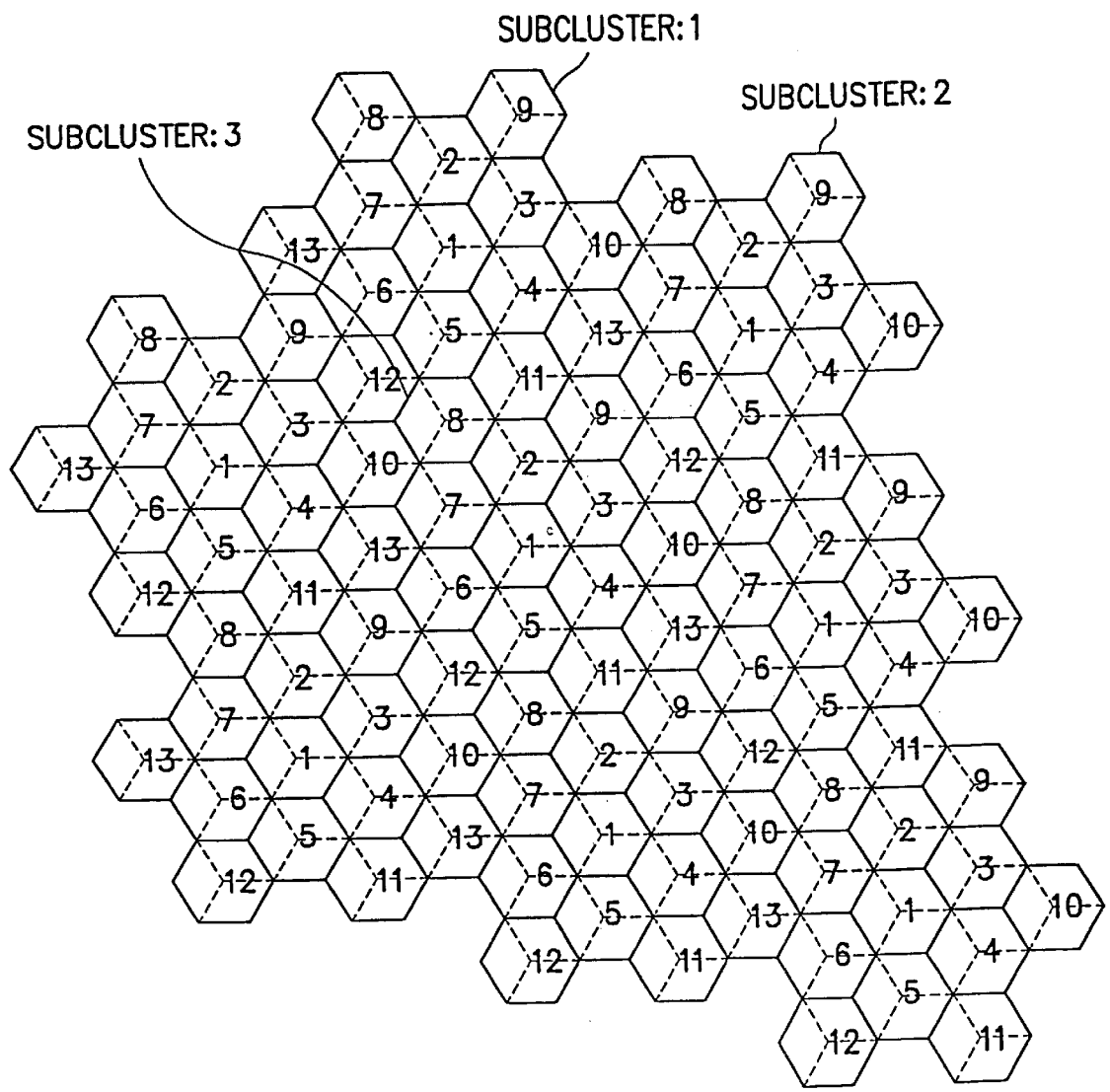
FIG. 8 illustrates base stations arranged using subclusters, for PN offset assignment in the digital mobile telecommunications system according to a first embodiment of the present invention.

Referring to FIG. 8 showing the first embodiment of the present invention, it is assumed that a single cluster includes three subclusters, the PT-inc is 4, a re-use distance is 10.8r, and a single subcluster has 13 general base stations and one reserved base station. Therefore, each subcluster is provided with 39 subcells of the 13 base stations and 3 subcells of the reserved base station. Therefore, with a PT-inc of 4, a total of 128 PN offsets are produced. The PN offsets are divided into four sets, the first three sets are used for three subclusters, respectively, and the remaining fourth set is reserved. When base stations are arranged as shown in FIG. 8, PN offsets are assigned to the base stations as in table 2.

TABLE 2

| No | first subcluster | | | second subcluster | | | third subcluster | | |
|---|---|---|---|---|---|---|---|---|---|
| | α | β | γ | α | β | γ | α | β | γ |
| 1 | 12 | 24 | 36 | 16 | 28 | 40 | 20 | 32 | 44 |
| 2 | 48 | 60 | 72 | 52 | 64 | 76 | 56 | 68 | 80 |
| 3 | 84 | 96 | 108 | 88 | 100 | 112 | 92 | 104 | 116 |
| 4 | 120 | 132 | 144 | 124 | 136 | 148 | 128 | 140 | 152 |
| 5 | 156 | 168 | 180 | 160 | 172 | 184 | 164 | 176 | 188 |
| 6 | 192 | 204 | 216 | 196 | 208 | 220 | 200 | 212 | 224 |
| 7 | 228 | 240 | 252 | 232 | 244 | 256 | 236 | 248 | 260 |
| 8 | 264 | 276 | 288 | 268 | 280 | 292 | 272 | 284 | 296 |
| 9 | 300 | 312 | 324 | 304 | 316 | 328 | 308 | 320 | 332 |
| 10 | 336 | 348 | 360 | 340 | 352 | 364 | 344 | 356 | 368 |
| 11 | 372 | 384 | 396 | 376 | 388 | 400 | 380 | 392 | 404 |
| 12 | 408 | 420 | 432 | 412 | 424 | 436 | 416 | 428 | 440 |
| 13 | 444 | 456 | 468 | 448 | 460 | 472 | 452 | 464 | 476 |
| 14 | 480 | 492 | 504 | 484 | 496 | 508 | 488 | 500 | 4 |

In the second embodiment of the present invention, PN offsets are assigned to base stations so that (1) the PN offset difference between sector α and sector β of a base station and between sector β and sector γ thereof is (PT-inc×the number of subclusters in a cluster×the number of base stations in a subcluster—(the number of subclusters having no PN offsets in their last base stations×PT-inc)), (2) the PN offset difference between the same sectors in the same-numbered base stations under different subclusters is PT-inc, and (3) the PN offset difference between the same sectors in a current base station and the next base station under the same subcluster is (the number of subclusters in a cluster× PT-inc).

Figure 9:
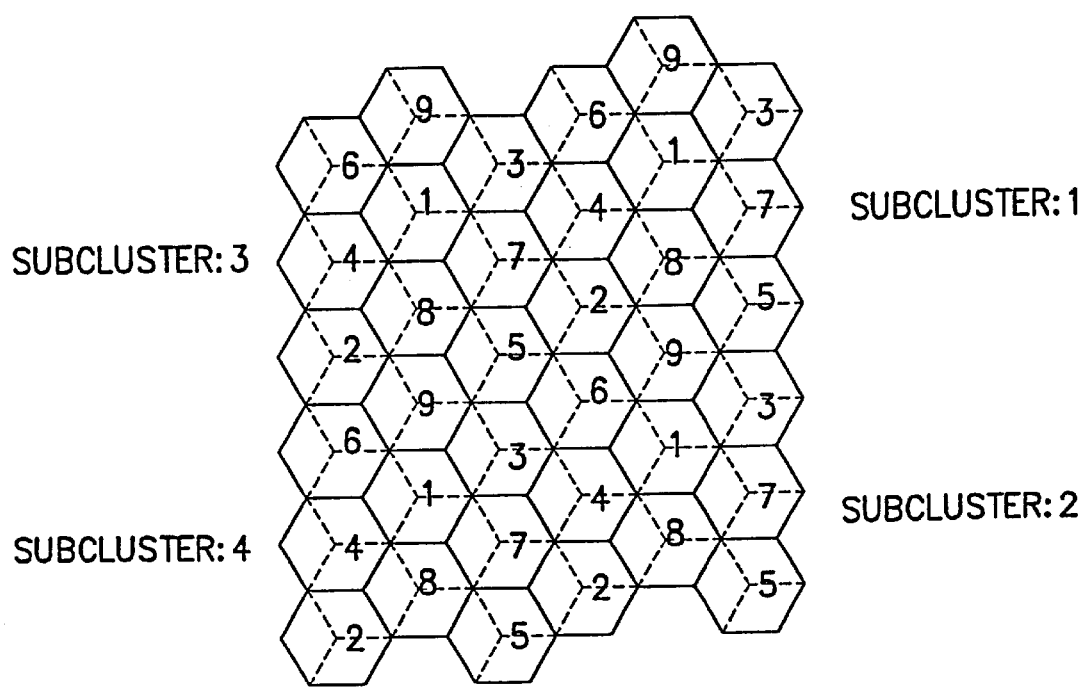
FIG. 9 illustrates base stations arranged using subclusters, for PN offset assignment in the digital mobile telecommunications system according to a second embodiment of the present invention.

Referring to FIG. 9 showing the second embodiment of the present invention, a single cluster has four subclusters, a PT-inc is 4, a re-use distance is 10.5r, and a single subcluster includes nine general base stations and two reserved base stations. Therefore, each subcluster is provided with 27 subcells of the nine base stations and 6 subcells of the two reserved base stations.

If base stations are arranged as shown in FIG. 9, the PN offset difference between sector α and sector β in an identical base station, and between sector β and sector γ thereof is 176=(the number of subclusters 4×the number of base stations 11×PT-inc 4). However, since PN offsets may not be assigned to the last base station, i.e., base station 11, (the number of subclusters having no PN offsets in their last base stations×PT-inc) is subtracted from 176. As shown in table 3, with no PN offsets assigned to the last base stations of subclusters 3 and 4, the offset difference between sectors is 168=(176−2×4). In addition, the PN offset difference between the same sectors in the same numbered base stations of different subclusters is PT-inc. For example, the PN offset difference between sectors a of base stations 1 under subclusters 1 and 2, under subclusters 2 and 3, or under subclusters 3 and 4 is 4. Furthermore, the PN offset difference between the same sectors in a current base station and the next base station under the same subcluster is 16=(the number of subclusters 4×PT-inc 4). Therefore, when base stations are arranged as shown in FIG. 9, PN offsets are assigned as in table 3.

TABLE 3

| No | first subcluster | | | second subcluster | | | third subcluster | | | fourth subcluster | | |
|---|---|---|---|---|---|---|---|---|---|---|---|---|
| | α | β | γ | α | β | γ | α | β | γ | α | β | γ |
| 1 | 4 | 172 | 340 | 8 | 176 | 344 | 12 | 180 | 348 | 16 | 184 | 352 |
| 2 | 20 | 188 | 356 | 24 | 192 | 360 | 28 | 196 | 364 | 32 | 200 | 368 |
| 3 | 36 | 204 | 372 | 40 | 208 | 376 | 44 | 212 | 380 | 48 | 216 | 384 |
| 4 | 52 | 220 | 388 | 56 | 224 | 392 | 60 | 228 | 396 | 64 | 232 | 400 |
| 5 | 68 | 236 | 404 | 72 | 240 | 408 | 76 | 244 | 412 | 80 | 248 | 416 |
| 6 | 84 | 252 | 420 | 88 | 256 | 424 | 92 | 260 | 428 | 96 | 264 | 432 |
| 7 | 100 | 268 | 436 | 104 | 272 | 440 | 108 | 276 | 444 | 112 | 280 | 448 |
| 8 | 116 | 284 | 452 | 120 | 288 | 456 | 124 | 292 | 460 | 128 | 296 | 464 |
| 9 | 132 | 300 | 468 | 136 | 304 | 472 | 140 | 308 | 476 | 144 | 312 | 480 |
| 10 | 148 | 316 | 484 | 152 | 320 | 488 | 156 | 328 | 492 | 160 | 332 | 496 |
| 11 | 164 | 332 | 500 | 168 | 336 | 504 | | | | | | |

Figure 10:
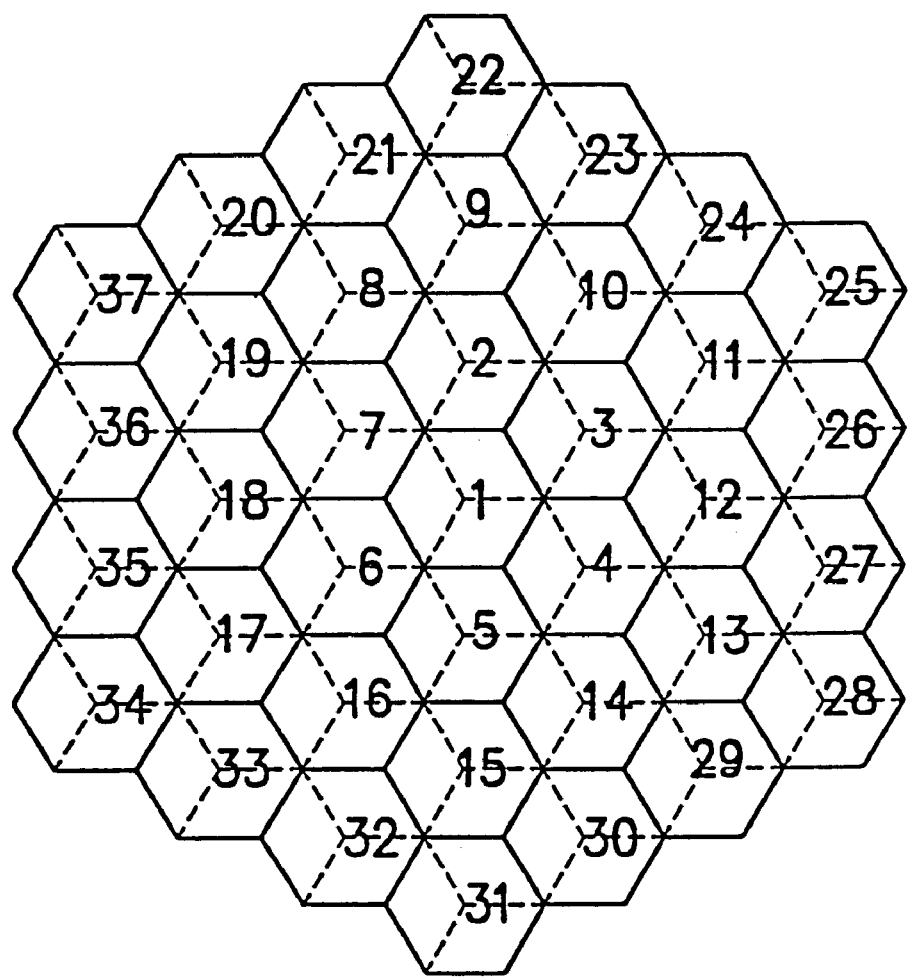
FIG. 10 illustrates base stations arranged without subclusters, for PN offset assignment in the digital mobile telecommunications system according to third and fourth embodiments of the present invention.

In the third embodiment of the present invention shown in FIG. 10, a single cluster has no subclusters, a PT-inc is 4, and a re-use distance is 10.5r. In this case, with 512 PN offsets available, the cluster includes base stations 1–37 (i.e., 111 subcells), and reserved base stations 38–43 (i.e., 18 subcells).

According to the PN offset assigning method in the third embodiment of the present invention, all the base stations are arranged under a single cluster without any subcluster. Base stations are arranged in a first tier surrounding base station 1 (hereinafter, referred to as a reference base station). For example, base stations 2–7 are arranged in the first tier around the reference base station 1, base stations 8–19 are arranged in a second tier surrounding the first tier, and base stations 20–37 are arranged in a third tier surrounding the second tier. Therefore, base stations are arranged sequentially from an inner tier to an outer tier.

In addition, PN offsets are assigned to the base stations so that (1) the PN offset difference between sector α and sector β of a base station and between sector β and sector γ thereof is PT-inc, and (2) the PN offset difference between the same sectors in a current base station and the next base station is (the number of sectors in a single base station×PT-inc).

When base stations are arranged as shown in FIG. 10, the PN offset between sector α and sector β of a base station and between sector β and sector γ thereof is the PT-inc, (i.e., 4). In addition, the PN offset difference between the same sectors in a current base station and the next base station is 12=(the number of sectors 3×PT-inc 4). Therefore, PN offsets are assigned to the sectors of the base stations as follows.

TABLE 4

| No | sector α | sector β | sector γ | No | sector α | sector β | sector γ |
|---|---|---|---|---|---|---|---|
| 1 | 4 | 8 | 12 | 23 | 268 | 272 | 276 |
| 2 | 16 | 20 | 24 | 24 | 280 | 284 | 288 |
| 3 | 28 | 32 | 36 | 25 | 292 | 296 | 300 |
| 4 | 40 | 44 | 48 | 26 | 304 | 308 | 312 |
| 5 | 52 | 56 | 60 | 27 | 316 | 320 | 324 |
| 6 | 64 | 68 | 72 | 28 | 328 | 332 | 336 |
| 7 | 76 | 80 | 84 | 29 | 340 | 344 | 348 |
| 8 | 88 | 92 | 96 | 30 | 352 | 356 | 360 |
| 9 | 100 | 104 | 108 | 31 | 364 | 368 | 372 |
| 10 | 112 | 116 | 120 | 32 | 376 | 380 | 384 |
| 11 | 124 | 128 | 132 | 33 | 388 | 392 | 396 |
| 12 | 136 | 140 | 144 | 34 | 400 | 404 | 408 |
| 13 | 148 | 152 | 156 | 35 | 412 | 416 | 420 |
| 14 | 160 | 164 | 168 | 36 | 424 | 428 | 432 |
| 15 | 172 | 176 | 180 | 37 | 436 | 440 | 444 |
| 16 | 184 | 188 | 192 | 38 | 448 | 452 | 456 |
| 17 | 196 | 200 | 204 | 39 | 460 | 464 | 468 |
| 18 | 208 | 212 | 216 | 40 | 472 | 476 | 480 |

TABLE 4-continued

| No | sector α | sector β | sector γ | No | sector α | sector β | sector γ |
|---|---|---|---|---|---|---|---|
| 19 | 220 | 224 | 228 | 41 | 484 | 488 | 492 |
| 20 | 232 | 236 | 240 | 42 | 496 | 500 | 504 |
| 21 | 244 | 248 | 252 | 43 | 508 | | |
| 22 | 256 | 260 | 264 | | | | |

In the fourth embodiment of the present invention, base stations are arranged as shown in FIG. 10.

Referring to FIG. 10, in the fourth embodiment of the present invention, PN offsets are assigned to base stations so that (1) the PN offset difference between sector α and sector β of a base station and between sector β and sector γ thereof is (PT-inc×the number of base stations), and (2) the PN offset difference between the same sectors in a current base station and the next base station is PT-inc.

In this embodiment, the number of base stations having PN offsets assigned to sectors α is 43, the number of base stations having PN offsets assigned to sectors β is 42, and the number of base stations having PN offsets assigned to sectors γ is 42. The PN offset difference between sector α and sector β in the same base station is 172=(PT-inc 4×the number of base stations 43), while the PN offset difference between sector β and sector γ thereof is 168=(PT-inc 4×the number of base stations 42). In addition, the PN offset difference between the same sectors in a current base station and the next base station is the PT-inc 4.

TABLE 5

Therefore, when base stations are arranged as shown in FIG. 10, PN offsets are assigned to the sectors of the base stations as in table 5.

| No | sector α | sector β | sector γ | No | sector α | sector β | sector γ |
|---|---|---|---|---|---|---|---|
| 1 | 4 | 176 | 344 | 23 | 92 | 264 | 432 |
| 2 | 8 | 180 | 348 | 24 | 96 | 268 | 436 |
| 3 | 12 | 184 | 352 | 25 | 100 | 272 | 440 |
| 4 | 16 | 188 | 356 | 26 | 104 | 276 | 444 |
| 5 | 20 | 192 | 360 | 27 | 108 | 280 | 448 |
| 6 | 24 | 196 | 364 | 28 | 112 | 284 | 452 |
| 7 | 28 | 200 | 368 | 29 | 116 | 288 | 456 |
| 8 | 32 | 204 | 372 | 30 | 120 | 292 | 460 |
| 9 | 36 | 208 | 376 | 31 | 124 | 296 | 464 |
| 10 | 40 | 212 | 380 | 32 | 128 | 300 | 468 |
| 11 | 44 | 216 | 384 | 33 | 132 | 304 | 472 |
| 12 | 48 | 220 | 388 | 34 | 136 | 308 | 476 |
| 13 | 52 | 224 | 392 | 35 | 140 | 312 | 480 |
| 14 | 56 | 228 | 396 | 36 | 144 | 316 | 484 |
| 15 | 60 | 232 | 400 | 37 | 148 | 320 | 488 |
| 16 | 64 | 236 | 404 | 38 | 152 | 324 | 492 |
| 17 | 68 | 240 | 408 | 39 | 156 | 328 | 496 |

TABLE 5-continued

Therefore, when base stations are arranged as shown in FIG. 10, PN offsets are assigned to the sectors of the base stations as in table 5.

| No | sector α | sector β | sector γ | No | sector α | sector β | sector γ |
|----|----------|----------|----------|----|----------|----------|----------|
| 18 | 72 | 244 | 412 | 40 | 160 | 332 | 500 |
| 19 | 76 | 248 | 416 | 41 | 164 | 336 | 504 |
| 20 | 80 | 252 | 420 | 42 | 168 | 340 | 508 |
| 21 | 84 | 256 | 424 | 43 | 172 |  |  |
| 22 | 88 | 260 | 428 |  |  |  |  |

Figure 11:
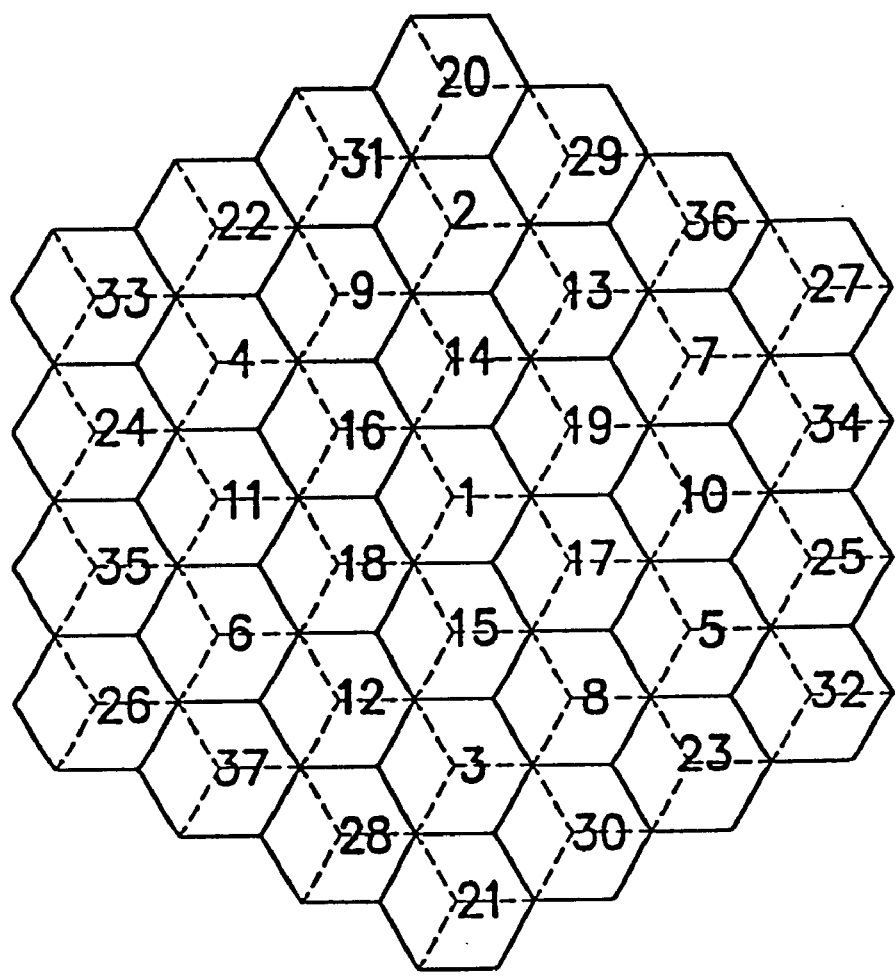
FIG. 11 illustrates base stations arranged without subclusters, for PN offset assignment in the digital mobile telecommunications system according to fifth and sixth embodiments of the present invention.

Referring to FIG. 11, the PN offset assigning method according to the fifth embodiment of the present invention will be described. In FIG. 11, a single cluster has no subclusters, a PT-inc is 4, and a re-use distance is 10.5r. In this case, with 512 PN offsets available, the cluster has 37 base stations 1–37 (i.e., 111 subcells) and 6 reserved base stations 38–43 (i.e., 18 subcells).

All base stations are arranged under the single cluster. Base stations 14–19 are arranged in a first tier surrounding base station 1 (hereinafter, referred to as reference base station 1), base stations 2–13 are arranged in a second tier surrounding the first tier, and base stations 20–37 are arranged in a third tier surrounding the second tier. That is, the base stations are arranged nonsequentially from an inner tier to an outer tier in the fifth embodiment.

In addition, PN offsets are assigned to base stations so that (1) the PN offset difference between sector α and sector β of a base station and between sector β and sector γ thereof is PT-inc, and (2) the PN offset difference between the same sectors in a current base station and the next base station is (the number of sectors in a base station×PT-inc).

With base stations are arranged as shown in FIG. 11, the PN offset difference between sector α and sector β in an identical base station and between sector β and sector γ thereof is the PT-inc, (i.e., 4), and the PN offset between the same sectors in a current base station and the next base station is 12=(the number of sectors 3×PT-inc 4). Therefore, PN offsets are assigned to the sectors as in table 4.

Referring to FIG. 11, the PN offset assigning method according to the sixth embodiment of the present invention will be described. In FIG. 11, a single cluster has no subclusters, a PT-inc is 4, and a re-use distance is 10.5r. In this case, with 512 PN offsets available, the cluster includes 37 base stations 1–37 (i.e., 111 subcells), and 6 reserved base stations 38–43 (i.e., 18 subcells).

All base stations are arranged under the single cluster without subclusters. Base stations 14–19 are arranged in a first tier surrounding reference base station 1), base stations 2–13 are arranged in a second tier surrounding the first tier, and base stations 20–37 are arranged in a third tier surrounding the second tier. That is, the base stations are arranged nonsequentially from an inner tier to an outer tier in the sixth embodiment.

Here, PN offsets are assigned to base stations so that (1) the PN offset difference between sector α and sector β of a base station and between sector β and sector γ thereof is (PT-inc×the number of base stations), and (2) the PN offset difference between the same sectors in a current base station and the next base station is PT-inc.

With the base stations arranged as shown in FIG. 11, the number of base stations having PN offsets assigned to sectors α is 43, the number of base stations having PN offsets assigned to sectors β is 42, and the number of base stations having PN offsets assigned to sectors γ is 42. The PN offset difference between sector α and sector β in the same base station is 172=(PT-inc 4×the number of base stations 43), while the PN offset difference between sector β and sector γ thereof is 168=(PT-inc 4×the number of base stations 42). In addition, the PN offset difference between the same sectors in a current base station and the next base station is the PT-inc 4.

Therefore, with base stations are arranged as shown in FIG. 11, PN offsets are assigned to the sectors of the base stations as in table 5.

As described above, the PN offset assigning method for a digital mobile telecommunications system according to the present invention is advantageous in that pilot PN code re-use efficiency is increased, co-pilot PN code interference is minimized, and delay-caused interference between base stations assigned different PN codes is minimized. In addition, simplicity of the pilot code assigning method facilitates management of a mobile telecommunications network, and reservation of pilot PN codes obviates the need for modifying the whole pilot PN arrangement when base stations are added.

What is claimed is:

1. A method for assigning a pilot PN offset to a base station in a digital mobile telecommunications system, comprising the steps of:

dividing a single cluster into a plurality of subclusters;

arranging a plurality of general base stations and reserved base stations, each having a plurality of sectors, in each of the subclusters; and assigning a pilot PN offset to each sector, such that a PN offset difference between a sector and a next sector in the same base station is equal to a pilot increment times the number of subclusters in the cluster according to sector numbers, wherein the PN offset difference between the same sectors in corresponding base stations under different subclusters is equal to the pilot increment, and the PN offset difference between the same sectors in a current base station and a next base station under an identical subcluster is equal to the number of subclusters in the cluster×the number of sectors in a base station×the pilot increment.

2. The method according to claim 1, wherein the single cluster comprises three subclusters, the pilot increment is 4, a PN offset re-use distance is 10.8r, and a single subcluster comprises thirteen general base stations and two reserved base stations.

3. A method for assigning a pilot PN offset to a base station in a digital mobile telecommunications system, comprising the steps of:

dividing a single cluster into a plurality of subclusters;

arranging a plurality of general base stations and reserved base stations, each having a plurality of sectors, in each of the subclusters; and assigning a pilot PN offset to each sector, such that PN offset difference between a sector and a next sector in the same base station is equal to a pilot increment times the number of subclusters in the cluster times the number of base stations in a subcluster—(the number of subclusters having no PN offsets in the last base stations thereof times the pilot increment) according to sector numbers, wherein the PN offset difference between the same sectors in corresponding base stations under different subclusters is equal to the pilot increment, and the PN offset difference between the same sectors in a current base station and the next base station under an identical subcluster is equal to the number of subclusters in the cluster times the pilot increment.

4. The method according to claim 3, wherein the cluster comprises four subclusters, the pilot increment is 4, a PN offset re-use distance is 10.5r, and a single subcluster comprises nine general base stations and two reserved base stations.

5. A method for assigning a pilot PN offset to a base station in a digital mobile telecommunications system, comprising the steps of:

dividing each of a plurality of base stations into a plurality of sectors;

arranging the base stations sequentially from an innermost tier to an outermost tier, centering on a reference base station in a single cluster; and assigning a pilot PN offset to each sector, such that a PN offset difference between a sector and a next sector in the same base station is a pilot increment according to sector numbers, and the PN offset difference between the same sectors in a current base station and the next base station is equal to the number of sectors in a base station times the pilot increment.

6. The method according to claim 5, wherein 512 PN offsets are available, said cluster comprises 37 general base stations and 6 reserved base stations, wherein each base station comprises three sectors, the pilot increment is 4, and a PN offset re-use distance is 10.5r.

7. A method for assigning a pilot PN offset to a base station in a digital mobile telecommunications system, comprising the steps of:

dividing each of a plurality of base stations into a plurality of sectors;

arranging the base stations from an innermost tier to an outermost tier, centering on a reference base station in a single cluster; and assigning a pilot PN offset to each sector, such that a PN offset difference between a sector and a next sector in the same base station is equal to a pilot increment times the number of base stations according to sector numbers.

8. The method according to claim 7 wherein the base stations are arranged sequentially from the innermost tier in the outermost tier, and the PN offset difference between the same sectors in a current base station and a next base station is equal to the pilot increment.

9. The method according to claim 8, wherein 512 PN offsets are available, said cluster comprises 37 general base stations and 6 reserved base stations, wherein each base station comprises three sectors, the pilot increment is 4, and a PN offset re-use distance is 10.5r.

10. The method according to claim 7, wherein the base stations are arranged nonsequentially from the innermost tier to the outermost tier, and the PN offset difference between the same sectors in a current base station and a next base station is equal to the pilot increment.

11. The method according to claim 10, wherein 512 PN offsets are available, said cluster comprises 37 general base stations and 6 reserved base stations, wherein base station comprises three sectors, the pilot increment is 4, and a PN offset re-use distance is 10.5r.

12. A method for assigning a pilot PN offset to a base station in a digital mobile telecommunications system, comprising the steps of:

dividing each of a plurality of base stations into a plurality of sectors;

arranging the base stations nonsequentially from an innermost tier to an outermost tier, centering on a reference base station in a single cluster; and assigning a pilot PN offset to each sector, such that a PN offset difference between a sector and a next sector in the same base station is a pilot increment according to sector numbers, and the PN offset difference between the same sectors in a current base station and a next base station is equal to the number of sectors in a base station times the pilot increment.

13. The method according to claim 12, wherein 512 PN offsets are available, said cluster comprises 37 general base stations and 6 reserved base stations, wherein base station comprises three sectors, the pilot increment is 4, and a PN offset re-use distance is 10.5r.

* * * * *